(No Model.)

D. C. BOWEN.
WIRE STRETCHER.

No. 347,462. Patented Aug. 17, 1886.

Witnesses:

Inventor:
Daniel C. Bowen
per Cyrus E. Perkins
his attorney

United States Patent Office.

DANIEL C. BOWEN, OF BYRON CENTRE, MICHIGAN, ASSIGNOR OF ONE-HALF TO BYRON McNEAL, OF SAME PLACE.

WIRE-STRETCHER.

SPECIFICATION forming part of Letters Patent No. 347,462, dated August 17, 1886.

Application filed March 16, 1885. Serial No. 159,083. (No model.)

*To all whom it may concern:*

Be it known that I, DANIEL C. BOWEN, a citizen of the United States, residing at Byron Centre, in the county of Kent and State of Michigan, have invented certain new and useful Improvements in Wire-Stretchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
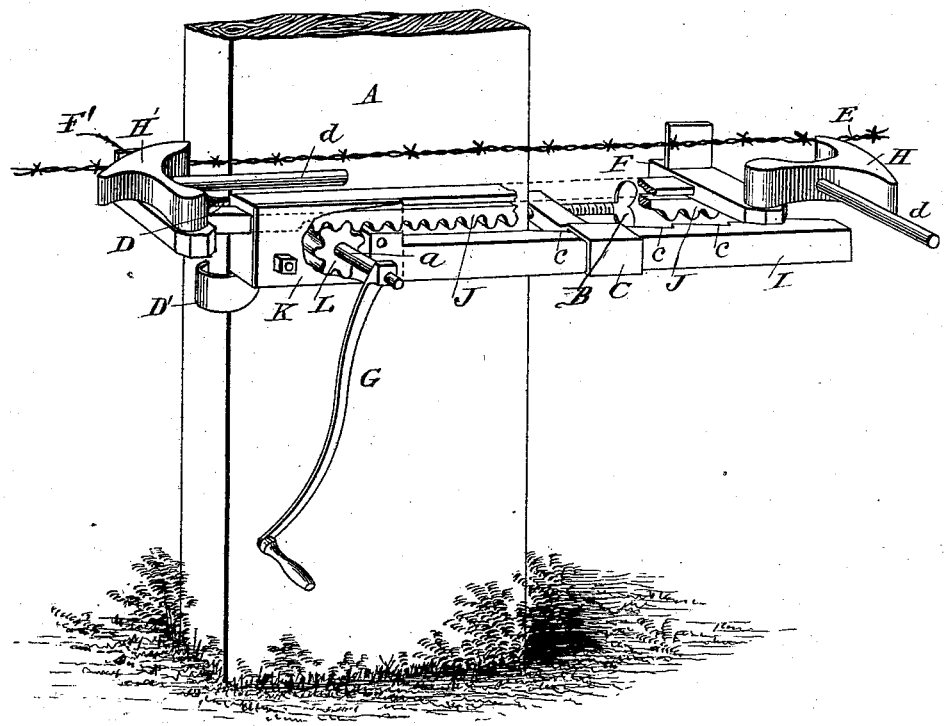
Figure 2:
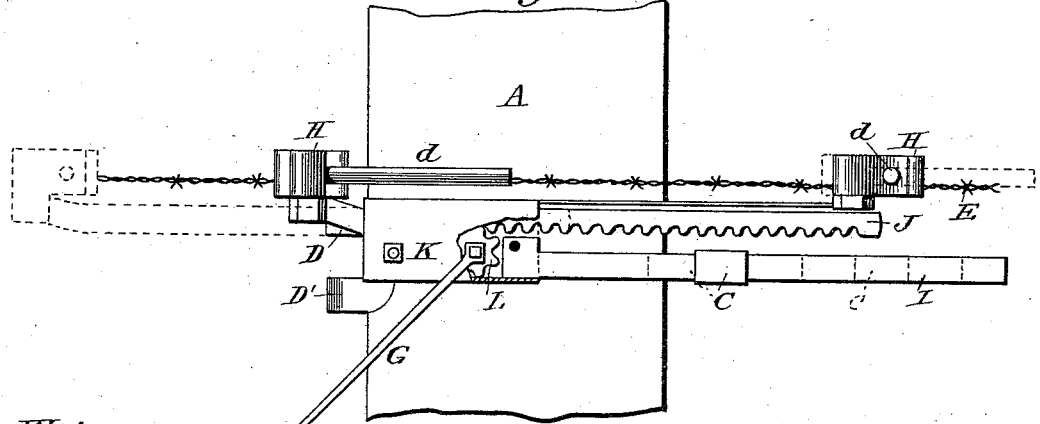

Figure 1 is a perspective view of my wire-stretcher. Fig. 2 is a side view with a portion of the plate removed to show the pinion.

Similar letters refer to similar parts.

My invention relates to improvements in wire-stretchers, wherein the wire is caught by a clutch carried along by a rack-bar and held by a stationary clutch, as hereinafter described.

My device is fastened to the fence-post by means of the hooks D D' on the one side and the set-screw B, held by a movable clamp, C, on the opposite side, said hooks being rigidly secured to the box K; also, firmly secured to said box K is the clamping-bar I, having the notches c c, and carrying the movable clamp C, whereby the stretcher may be readily adjusted to a post of any size. Immediately above the clamping-bar I and parallel thereto is the rack-bar J, operated by the pinion L on the shaft a and the crank G. At one end of the rack-bar is the dog H', having the handle d and a convex face pinching upon the lug F'. A similar clutching device, H F, is rigidly secured upon an arm extending from the box K in the opposite direction and on a level with the clutch first named. The wire E, being placed within the clutch H' F', is drawn in by the turning of crank and pinion to the limit of extension of the rack-bar J, and is then caught by the stationary clutch H F. The rack-bar may be then run back and the operation renewed until the wire is stretched as tightly as desired.

It will be observed that by the arrangement of parts shown and described the wire is carried on the top of the stretcher past and contiguous to the post on which the same is placed, and may readily be fastened to such post before the stretcher is removed, which is regarded as a decided improvement over such wire-stretchers as do not permit of this.

Having thus described my invention, what I claim, and desire to secure by Letters Patent, is—

In a wire-stretcher, the combination of the box K, having hooks D D', and an arm extending from and integral with said box, lug F, and dog H, carried by said arm, clamping-bar I, having side notches, c c, secured to said bar, clamp C, mounted on said bar and carrying set-screw B, rack-bar J, having upon its inner end lug F', and dog H', pivoted on said bar, pinion L, and crank G, substantially as shown and described.

In testimony whereof I affix my signature in the presence of two witnesses.

DANIEL C. BOWEN.

Witnesses:
WM. A. CHAPMAN,
ADOLPH B. MASON.